United States Patent [19]

Jyoujiki

[11] 4,307,947
[45] Dec. 29, 1981

[54] FOCUS DETECTING DEVICE FOR CAMERA

[75] Inventor: Masao Jyoujiki, Tsurugashima, Japan

[73] Assignee: Asahi Kogaku Kogyo Kabushiki Kaisha, Tokyo, Japan

[21] Appl. No.: 167,280

[22] Filed: Jul. 9, 1980

[30] Foreign Application Priority Data

Jul. 10, 1979 [JP] Japan .................................. 54/87107

[51] Int. Cl.³ ........................ G03B 3/00; G03B 19/12; G01J 1/10
[52] U.S. Cl. ...................................... 354/25; 354/31; 354/152; 250/204
[58] Field of Search .................. 354/25, 31, 56, 25 A, 354/31 F, 152; 352/140; 250/201, 204, 578; 355/56

[56] References Cited

U.S. PATENT DOCUMENTS 3,185,059  5/1965  Durst ..................................... 354/25

Primary Examiner—Joseph W. Hartary
Assistant Examiner—William B. Perkey
Attorney, Agent, or Firm—Sughrue, Mion, Zinn, Macpeak & Seas

[57] ABSTRACT

A focus detecting device for a camera in which a portion of the light passing through a photographing lens is reflected to a first surface of a plane plate of transparent material. After passing through the plane plate, the beam is split by a half-silvered mirror with one beam emerging from the half-silvered mirror and plane plate while the other is reflected back through the plane plate towards the first surface. At the first surface, the second beam is reflected back again through the plane plate emerging therefrom at a point removed from the half-silvered mirror striking a second sensor located in the same plane as the first sensor. The outputs from the sensors, which are preferably linear arrays of photodiodes, are processed to provide a focus detecting signal which is further processed to provide signals indicating front focus, correct focus and rear focus.

5 Claims, 14 Drawing Figures

FOCUS DETECTING DEVICE FOR CAMERA

BACKGROUND OF THE INVENTION

The present invention relates to focus detecting devices for cameras. More specifically, the invention relates to a focus detecting device in which focus detection is carried out by detecting the contrast of an image formed by the photographing lens.

It is well known in the art that a characteristic curve indicating the relation between an amount of defocus (defined as the distance between the image plane in a focused condition and the image plane in its defocused condition) and the amount of high frequency components in the spatial frequency spectrum of the image has a peak value as shown in FIG. 1 at the focused position and that, as the amount of defocus increases, the amount of high frequency components correspondingly decreases. Furthermore, a high frequency component detecting technique is also known in the art in which an array of light receiving elements having uniform photoelectric characteristics are arranged in a line as shown in FIG. 2 in a plane parallel to the image plane. The amount of high frequency components is detected by forming the sum of differences between the outputs of adjacent light receiving elements. In FIG. 2, five light receiving elements are arranged in a single straight line. The amount of high frequency components detected in this manner will be referred to as "a contrast output" for simplification of description hereinafter.

In some conventional focus detecting devices, sensors are disposed on both sides of the film surface to detect a focusing condition according to these principles. An example of a conventional light beam splitting arrangement is as shown in FIG. 12 in which a light beam is split by a half-silvered mirror 14 into two separate beams which are applied to sensors 3 and 5. However, it should be noted that, with the arrangement in FIG. 12, it is difficult to provide the two sensors on a single substrate. Accordingly, it is also difficult to make the characteristics of the two sensors uniform or to align the positions of the half-silvered mirror and the two sensors with the result that it is difficult to miniaturize such a focus detecting device.

Shown in FIG. 13 is another example of a conventional light beam splitting arrangement. In this example, a light beam reflected by a half-silvered mirror 14 is deflected parallel to the light beam passing through the half-silvered mirror 14 by the provision of a mirror 15. In this case, it is possible to provide two sensors on one substrate. However, the arrangement is disadvantageous in that it is difficult to firmly position the half-silvered mirror 14, the mirror 15 and the sensors 3 and 5 and accordingly such a focus detecting device is necessarily bulky.

An object of the invention is to provide a focus detecting device in which two arrays of contrast detecting light receiving elements, hereinafter referred to as "sensors", are disposed on both sides of the film surface of a camera and the contrast outputs of the sensors are compared thereby to detect focusing conditions such as front focus, correct focus, and rear focus.

SUMMARY OF THE INVENTION

This, as well as other objects of the invention, are met by a focus detecting device for a camera including a photographing lens including a plane plate having first and second surfaces disposed with the plane plate at a predetermined angle to an incoming beam which is a portion of the light beam coming through the photographing lens. A half-silvered mirror is formed on the second or lower surface of the plane plate. A first beam passing through the half-silvered mirror emerges and strikes a first sensor. A second beam reflected from the half-silvered mirror back through the plane plate is reflected once it reaches the first surface by a totally reflecting mirror disposed over a portion of the first surface remote from the position at which the entering light beam strikes. The beam reflected back through the plane plate emerges from the second surface at a point remote from the half-silvered mirror formed thereon and strikes a second sensor. The first and second sensors are disposed in a single plane.

DESCRIPTION OF THE PREFERRED EMBODIMENTS

Figure 3:
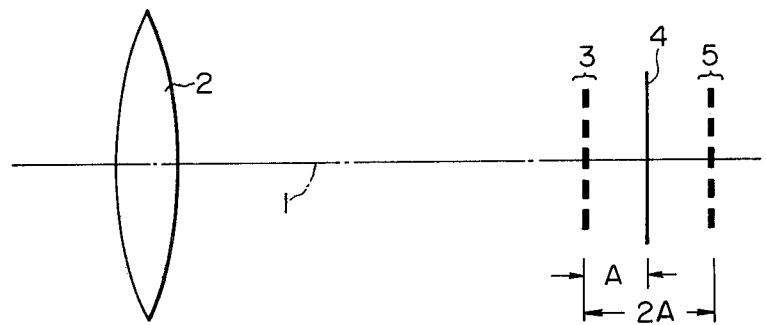
FIG. 3 is an explanatory diagram showing two sensors disposed on both sides of a film surface.

FIG. 3 is a diagram for a description of the principle of operation of a focus detecting device constructed in accordance with the present invention. In FIG. 3, reference numeral 1 designates the optical axis of a photographing lens 2, 3 a sensor spaced a distance A from a film surface 4 toward the lens 2, and 5 a sensor spaced the same distance A from the film surface 4 in the opposite direction. That is, the two sensors 3 and 5 are positioned on opposite sides of the film surface 4 at equal distances therefrom. It is assumed that the exposure conditions of the sensor 3, the film surface 4 and the sensor 5 are not disturbed by one another.

With this arrangement, when the image plane of the photographing lens 2 is in front of the film surface 4, that is, for front focus, the contrast output of the sensor 3 is greater than that of the sensor 5. On the other hand, when the image plane of the lens 2 is behind the film surface, that is, for rear focus, the contrast output of the sensor 5 is greater than that of the sensor 3. When the image plane coincides with the film surface 4, the contrast output of the sensor 3 is equal to that of the sensor 5.

Figure 5:
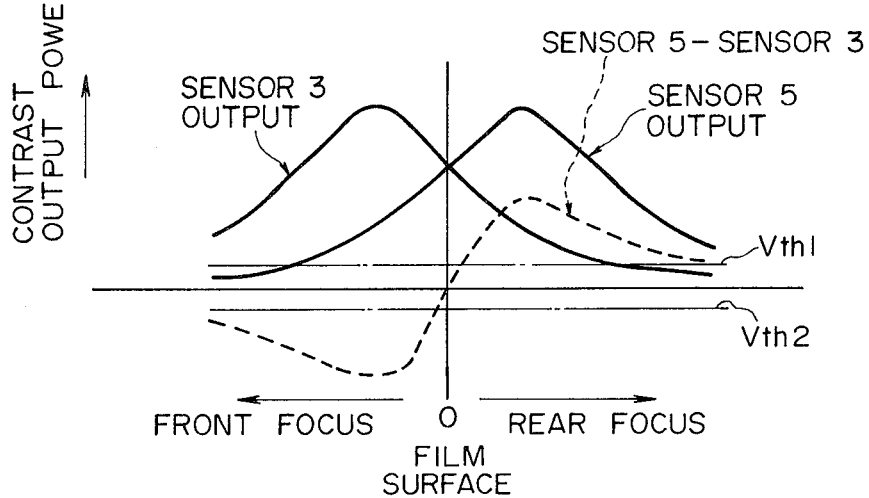
FIG. 5 is a graphical representation indicating the variations of contrast outputs at a focused position and defocused positions.

The above description of the principle of operation of the focus detecting device of the invention will become more apparent upon consideration of the graphical representation of FIG. 5. When a difference signal formed by subtracting the contrast output of the sensor 3 from the contrast output of the sensor 5 is positive, the image of the object is formed behind the film surface corresponding to a rear focus condition. When the difference signal is negative, the image of the object is formed in front of the film surface corresponding to a front focus condition. When the difference signal is zero, the image is formed on the film surface corresponding to a position of correct focus.

Figure 4:
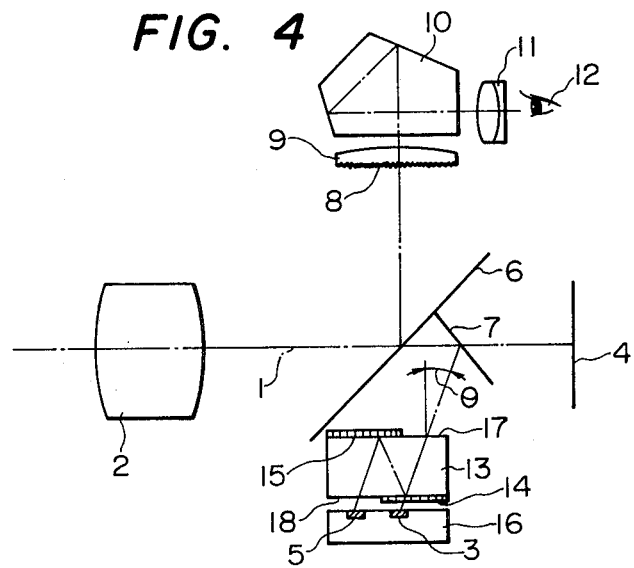
FIG. 4 is an explanatory diagram showing the arrangement of an example of a single-lens reflex camera embodying a focus detecting device of the invention.

FIG. 4 shows an example of a single-lens reflex camera embodying a device constructed in accordance with the invention. A light beam from a photographing lens 2 is split by first half-silvered mirror 6 into two light beams. One of the two light beams is reflected upwardly by the half-silvered mirror 6 as a result of which the light beam reaches the user's eye 12 via a focus surface 8, a condenser lens 9, a penta-prism 10 and a "Lupe" magnifier 11. The other light beam passes through the half-silvered mirror 6 and reaches a mirror 7 where it is reflected downwardly towards the photographing lens 2 in a direction forming an angle $\theta$ with the optical axis 1. The light beam reflected by the mirror 7 is applied to a parallel plane plate 13 made of transparent material such as glass hereinafter referred to as "glass plate 13". The glass plate 13 has two parallel surfaces 17 and 18 which are coated with a transmission increasing material. The light beam enters the glass plate 13 through the surface 17 and is then split into two light beams by a second half-silvered mirror 14 which is disposed on the surface 18. One of the two light beams passes through the half-silvered mirror 14 and strikes a sensor 3. The other light beam is reflected by the half-silvered mirror 14 and it is further reflected by a mirror 15 on the surface 17, passes through the surface 18 and strikes a sensor 5. The distance between the sensor 3 and the photographing lens 2 is different from the distance between the sensor 5 and the lens 2. The difference between these distances corresponds to the value 2A in FIG. 3 with the difference being dependent upon the inclination angle $\theta$. Hereinafter, a plane which is at a position equivalent to that of the film surface 4 with regard to the optical distance from the photographing lens 2 will be referred to as "an equivalent film surface". With the construction shown in FIG. 4, the equivalent film surface is at the midpoint between the sensors 3 and 5.

Figure 6:
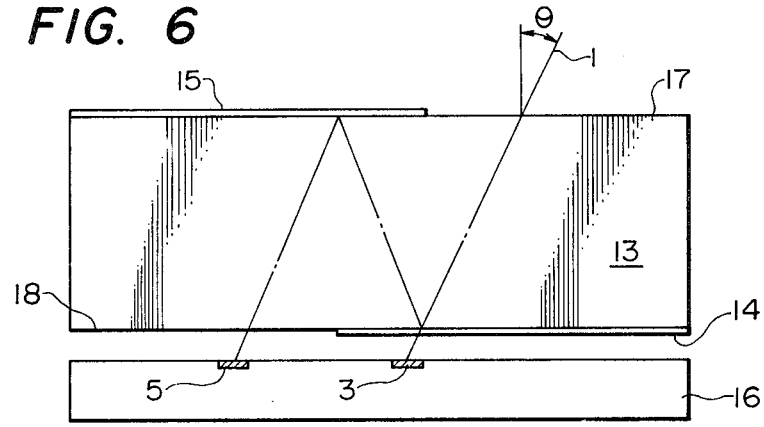
FIG. 6 is an enlarged view of the sensors and components related thereto in FIG. 4.

The arrangement of the sensors 3 and 5 and the various components associated therewith will become more apparent from FIG. 6 which is an enlarged view of a portion of FIG. 4. In FIG. 6, reference numeral 16 designates a substrate supporting the sensors 3 and 5. The light beam entering from above is split into two beams by the half-silvered mirror 14 and the two light beams are applied to the sensors 3 and 5. If the sensors 3 and 5 are made up of silicon photodiodes, in order to make the spectral characteristics thereof agree with the spectral luminous efficiencies it is effective to replace the transmission increasing coat on the surface 17 by an infrared ray filter.

Figure 7:
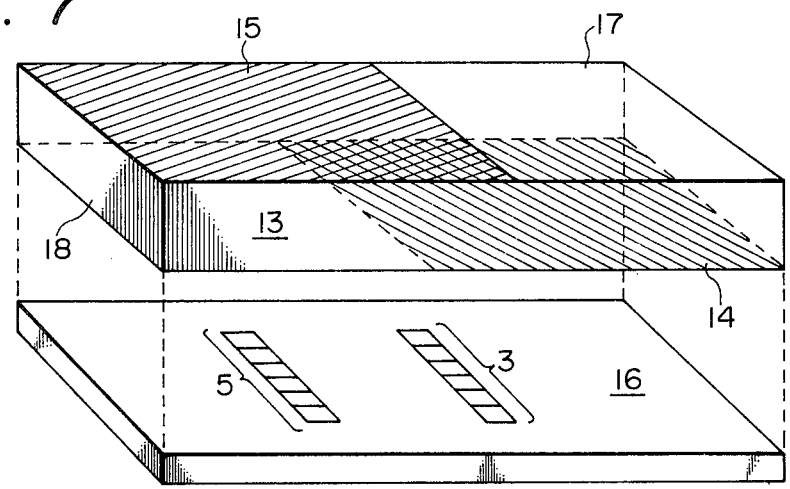
FIG. 7 is a perspective view showing the positional relation between the sensors and a light splitter.

FIG. 7 is a perspective view of the glass plate 13 and the substrate 16 of FIG. 6 showing the arrangement of the sensors 3 and 5 and the positions of the mirror 15 and the half-silvered mirror 14. It should be noted that in order for the arrangement of the sensors 3 and 5 to be clearly seen, the glass plate 13 and the substrate 16 shown in FIG. 7 are spaced from each other more widely than in the actual construction. The half-silvered mirror 14 is preferably produced with a multi-layer film coating technique. The mirror 15 can be produced by vacuum-evaporating chromium, aluminum or silver. The mirrors in FIGS. 4 and 6 are shown relatively thick for clarity. In practice, however, the mirrors are quite thin.

Figure 1:
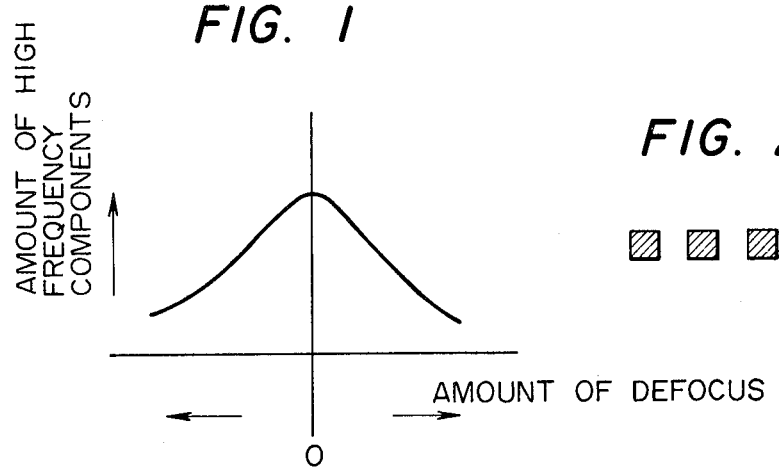
FIG. 1 is a graphical representation indicating the relation between an amount of defocus and an amount of high frequency component.
Figure 2:
FIG. 2 is an explanatory diagram showing a line of light receiving elements.
Figure 8:
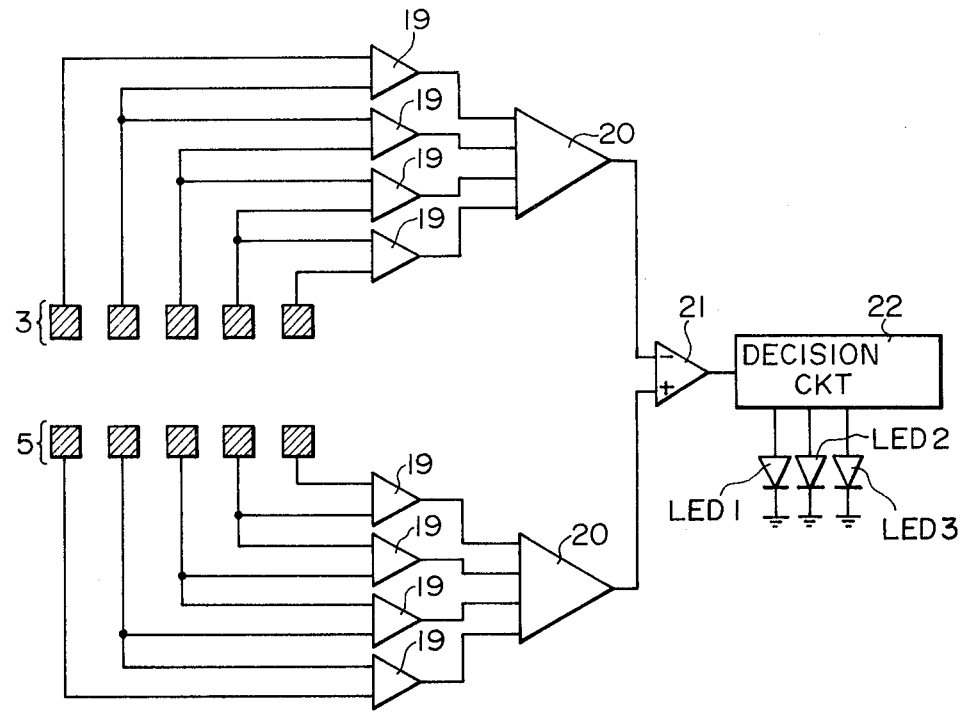
FIG. 8 is a circuit diagram, partly as a block diagram, showing an example of a single processing circuit employed in the focus detecting device of the invention.

FIG. 8 shows an example of a processing circuit in which the differences between the contrast outputs of the sensors is formed to produce a focusing signal. In the processing circuit, each of the sensors 3 and 5 is made up of five light receiving elements having uniform photoelectric characteristics. First, difference signals are formed from the outputs of adjacent pairs of light receiving elements of each sensor and the absolute values of the differences therebetween are outputted by difference circuits 19. Then, the two absolute value signals outputted by the circuits 19 are added by a circuit 20 to thereby provide the contrast output signals. The contrast output signals from the sensors 3 and 5 are applied to a subtraction circuit 21 in which the contrast output of the sensor 5 is subtracted from the contrast output of the sensor 3. The difference signal is negative in the case of front focus and positive in the case of rear focus as described with reference to FIG. 1. The output difference signal from the subtraction circuit 20 is applied to a decision circuit 22 which determines whether the difference signal is negative, positive or zero. Depending on the decision outputs of the decision circuit 22, one of the light emitting diodes LED1, LED2 and LED3 which indicate correct focusing, front focus and rear focus are turned on.

Figure 9:
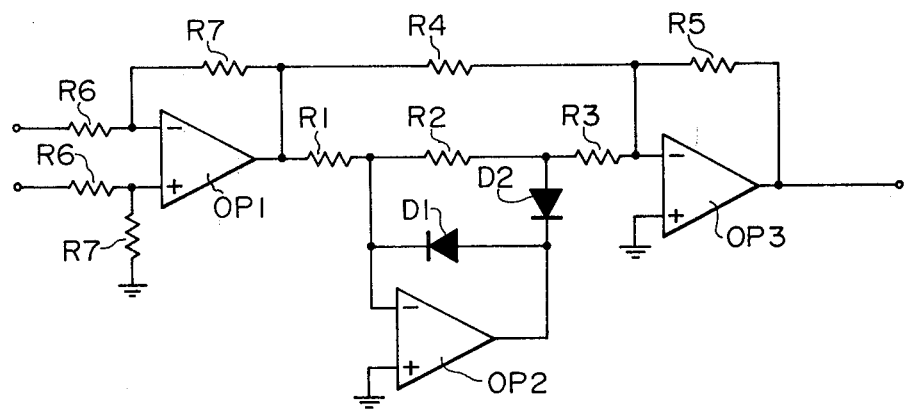
FIG. 9 is a circuit diagram showing an example of a circuit for forming the absolute value of a difference between two signals.

A preferred example of the circuit 19 for obtaining the absolute value of a difference is shown in FIG. 9. The circuit 19 includes operational amplifiers OP1, OP2 and OP3, diodes D1 and D2, and resistors R1 through R7. The difference between two signals applied through the resistors R6 is formed by the operational amplifier OP1 and the absolute value of the difference is outputted by a circuit composed of the operational amplifiers OP2 and OP3, the diodes D1 and D2 and the resistors R1 through R5.

Figure 10:
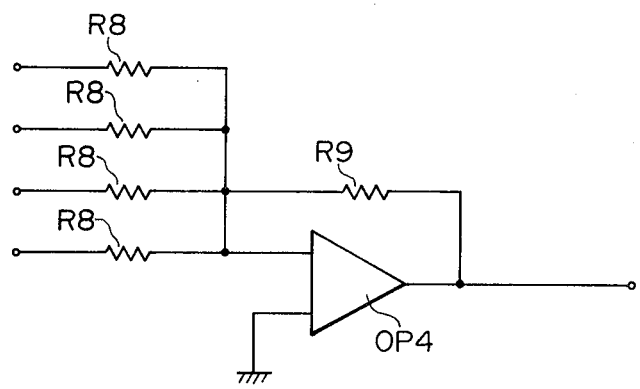
FIG. 10 is a circuit diagram showing an example of an addition circuit in the signal processing circuit of FIG. 8.

FIG. 10 shows a preferred example of the addition circuit 20 which includes an operational amplifier OP4 and resistors R8 and R9.

Figure 11:
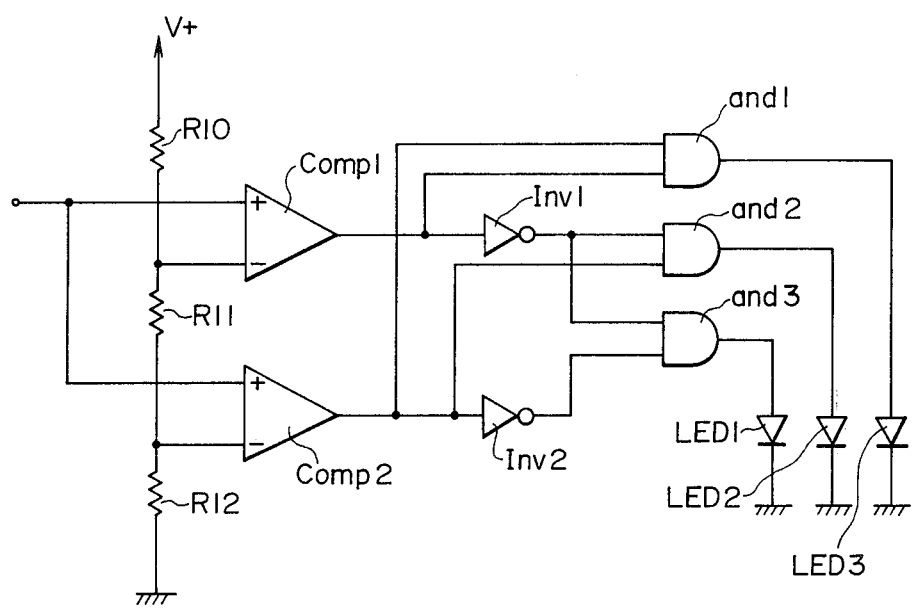
FIG. 11 is a circuit diagram, partly as a block diagram, showing a circuit 22 in FIG. 8 in detail.
Figure 12:
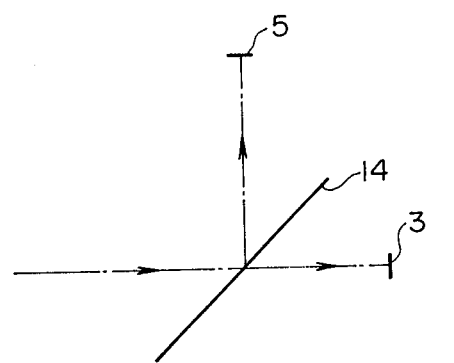
FIGS. 12 and 13 are explanatory diagrams for a description of examples of a conventional light beam splitting method.
Figure 13:
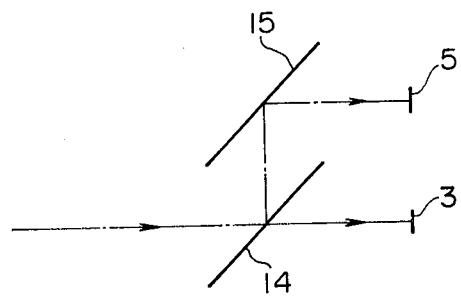

An example of the decision circuit 22 as shown in FIG. 11 includes comparators COMP1 and COMP2, inverters INV1 and INV2, AND circuits AND1 through AND3, and resistors R10, R11 and R12 which are connected to provide comparison voltages. A voltage Vth-1 at the connection point of the resistors R10 and R11 and a voltage Vth-2 at the connection of the resistors R11 and R12 are indicated in FIG. 5. When the output of the circuit 21, which subtracts the contract output of the sensor 3 from the contrast output of the sensor 5, is higher than the voltage Vth-1, the light emitting diode LED3 indicating rear focus is turned on. When the output of the circuit 21 is lower than the voltage Vth-1 but higher than the voltage Vth-2, the light emitting diode LED2 indicating correct focus is turned on. When the output of the circuit 21 is lower than the voltage Vth-2, the light emitting diode LED3 indicating front focus is turned on.

In the circuit in FIG. 11, the voltage Vth-1 is different from the Vth-2 because, by making the voltage Vth-1 unequal to the voltage Vth-2, the focusing range is increased which is preferable for use with the focus detecting device. With the focus detecting device of the invention, a signal indicating front focus, a signal indicating correct focus, and a signal indicating rear focus are provided as described above.

The device of the invention can be manufactured by coating both surfaces of a sheet of flat plate in such a manner that a light beam is split as described above.

Figure 14:
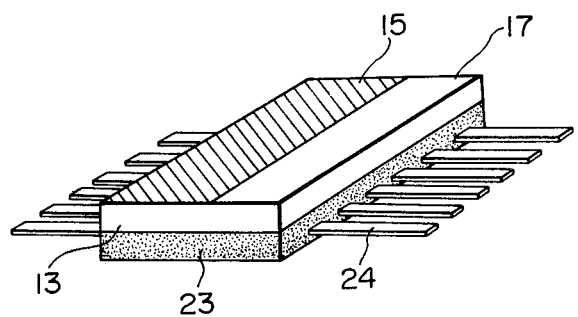
FIG. 14 is a perspective view showing an example of the focus detecting device of the invention in the form of an integrated circuit flat package.

FIG. 14 is a perspective view of an example of a focus detecting device of the invention constructed in the form of an IC flat package. In FIG. 14, reference numeral 23 designates a ceramic package or the like and reference numeral 24 designates input and output pins of the processing circuit. As is clear from FIG. 14, the focus detecting device of the invention thus constructed is sufficiently so small that it can be readily mounted in a camera.

Unlike a conventional focus detecting device in which a single sensor is employed and variations of the contrast output signal from the sensor are detected by moving the photographing lens to determine the peak value of the contrast output thereby to detect the correct focus position, the focus detecting device of the invention is free from defocus which may be caused when the camera is shaken during the movement of the photographing lens. Furthermore, the focus detecting device of the invention can be easily and inexpensively manufactured because the half-silvered mirror surface and the bulky reflecting mirror surface can both be provided on the surfaces of a single glass plate. Yet further, in the arrangement of the invention shown in FIG. 7, the substrate 16 may be a silicon wafer and the sensors 3 and 5 and the signal processing circuit in FIG. 8 can be provided on the substrate 16. The distance between the sensors 3 and 5 is preferably a fraction of a millimeter which is quite sufficient in practical use. Therefore, the thickness of the glass plate is correspondingly a fraction of a millimeter. Thus, a focus detecting device of the invention is very small in size and is in fact substantially equal in size to an ordinary solid photographing element.

An automatic focus control device can be readily provided by using the device of the invention because the device of the invention provides a front focus signal, a correct focus signal and a rear focus signal in the manner described.

What is claimed is:

1. A focus detecting device for a camera having a photographing lens comprising: means for deflecting a portion of a light beam passing through said photographing lens in a certain direction; a plane plate made of transparent material disposed at a predetermined angle with respect to the direction of said portion of said beam, said plane plate having first and second surfaces parallel to one another, said portion of said beam entering said plane plate at said first surface; a half-silvered mirror disposed upon a portion of said second surface of said plane plate at a position where said portion of said beam passing through said plane plate emerges from said second surface, a first beam passing through said half-silvered mirror and a second beam being reflected by said half-silvered mirror towards said first surface of said plane plate; a totally reflecting mirror disposed upon a portion of said first surface of said plane plate at a point at which emerges said second beam, said totally reflecting mirror reflecting said second beam back through said plane plate to emerge at a position away from said half-silvered mirror; first and second arrays of light sensors, said first array of light sensors being positioned to receive said first beam transmitted through said half-silvered mirror and said second array of sensors being positioned to receive said second beam upon emerging from said second surface.

2. The focus detecting device of claim 1 wherein said first and second arrays of sensors are disposed upon a planar substrate.

3. The focus detecting device of claim 1 wherein said half-silvered mirror is formed as a multi-layered film and wherein said totally reflecting mirror is formed by vacuum-evaporation of a material selected from the group consisting of chromium, aluminum and silver.

4. The focus detecting device of claim 1 further comprising coatings of reflection preventing films disposed upon areas of said first and second surfaces not covered by said half-silvered mirror and said totally reflecting mirror.

5. The focus detecting device of any of claims 1-4 wherein said first and second arrays of sensors each comprise a linear array of photoelectric elements.

* * * * *